(12) United States Patent
Sohn et al.

(10) Patent No.: US 6,924,862 B2
(45) Date of Patent: Aug. 2, 2005

(54) METHOD FOR FABRICATING LIQUID CRYSTAL DISPLAY DEVICE

(75) Inventors: Se Il Sohn, Kyongsangnam-do (KR); Cheol Se Kim, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 149 days.

(21) Appl. No.: 10/223,375

(22) Filed: Aug. 20, 2002

(65) Prior Publication Data

US 2003/0048404 A1 Mar. 13, 2003

(30) Foreign Application Priority Data

Sep. 8, 2001 (KR) ..................... P 2001-55298

(51) Int. Cl.[7] ........................... G02F 1/1343
(52) U.S. Cl. ..................... 349/139; 349/38; 349/39
(58) Field of Search ..................... 349/139, 138, 349/38, 43, 47, 84, 32; 257/791–793; 438/82, 99, 149

(56) References Cited

U.S. PATENT DOCUMENTS

| | | | | |
|---|---|---|---|---|
| 5,326,712 A | * | 7/1994 | Bae | 438/158 |
| 5,995,174 A | * | 11/1999 | Ukita | 349/43 |
| 6,080,529 A | * | 6/2000 | Ye et al. | 430/318 |
| 6,265,031 B1 | * | 7/2001 | Ishii et al. | 427/460 |
| 6,319,321 B1 | * | 11/2001 | Hiraga et al. | 118/666 |
| 6,346,730 B1 | * | 2/2002 | Kitakado et al. | 257/350 |
| 6,362,507 B1 | * | 3/2002 | Ogawa et al. | 257/350 |
| 6,568,978 B2 | * | 5/2003 | Kataoka et al. | 445/24 |
| 6,614,493 B1 | * | 9/2003 | Kim et al. | 349/43 |
| 6,697,138 B2 | * | 2/2004 | Ha et al. | 349/114 |
| 6,720,198 B2 | * | 4/2004 | Yamagata et al. | 438/29 |
| 2001/0040648 A1 | * | 11/2001 | Ono et al. | 349/43 |
| 2002/0022307 A1 | * | 2/2002 | Park et al. | 438/149 |
| 2002/0145143 A1 | * | 10/2002 | Kawasaki et al. | 257/72 |
| 2003/0193090 A1 | * | 10/2003 | Otani et al. | 257/758 |

FOREIGN PATENT DOCUMENTS

JP 01224726 A * 9/1989 ........... G02F/1/133

* cited by examiner

Primary Examiner—Thien M. Le
Assistant Examiner—Edwyn Labaze
(74) Attorney, Agent, or Firm—McKenna Long & Aldridge LLP

(57) ABSTRACT

A method of fabricating liquid crystal display devices that includes plasma etching an insulation layer while simultaneously removing contaminates from the exposed surface of a substrate. Thinning of the substrate can then be performed by a subsequent etch process to form a highly planar substrate surface that can improve the picture quality of the completed LCD device.

18 Claims, 6 Drawing Sheets

METHOD FOR FABRICATING LIQUID CRYSTAL DISPLAY DEVICE

This application claims the benefit of the Korean Application No. P2001-55298 filed on Sep. 8, 2001, which is hereby incorporated by reference.

BACKGROUND OF THE INVENTION

1. Field of the Invention

The present invention relates to liquid crystal display (LCD) devices, and more particularly, to a method of fabricating liquid crystal panels having an improved picture quality.

2. Discussion of the Related Art

Recently, liquid crystal display (LCD) devices have attracted attention as substitutes for cathode ray tubes (CRTs). LCDs have the advantages of being thin, lightweight, and portable, and consume little power. In particular, being lightweight is highly important in many applications.

An LCD device is typically comprised of two glass substrates and a liquid crystal layer that is disposed between the two glass substrates. To reduce the weight of an LCD device it is beneficial to use thin glass substrates. This is particularly important because the glass substrates are typically the heaviest part of an LCD device. Thus, thin glass substrates are beneficial. However, because of manufacturing stresses it is better to use relatively thick glass substrates during fabrication. In practice, LCD devices are often fabricated using thick glass substrates that are subsequently thinned. There are two basic methods of thinning glass substrates, polishing and etching. The principles of the present invention are primarily directed to etched glass substrates.

Figure 1:
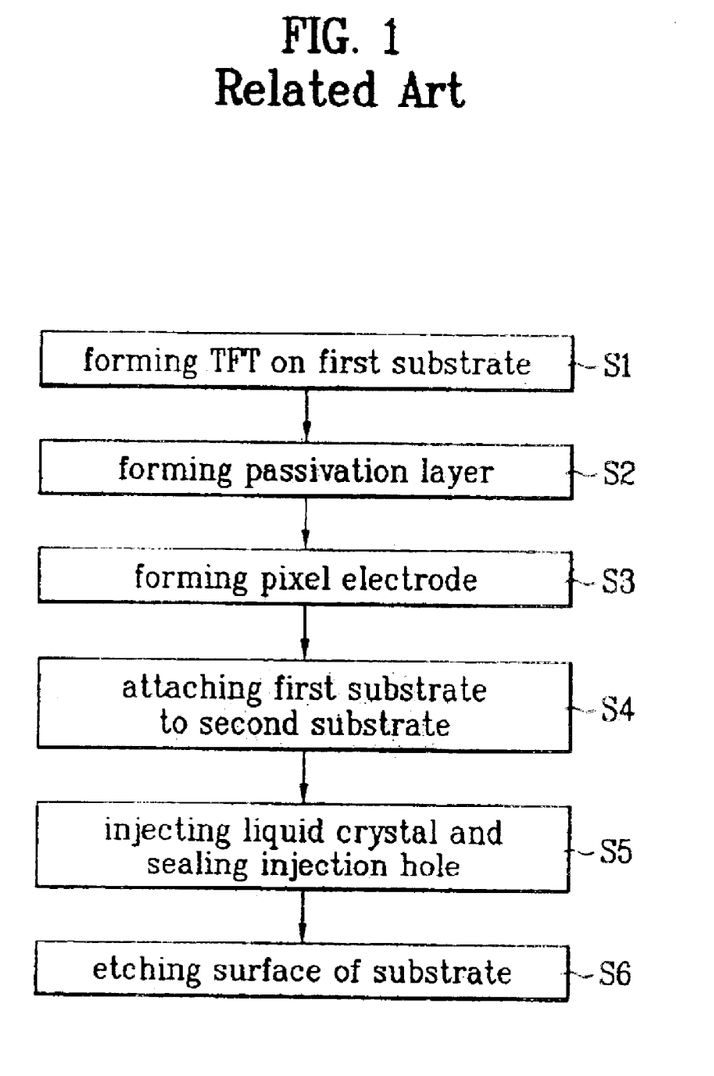
FIG. 1 is a block diagram showing fabricating steps of a related art liquid crystal display panel.
Figure 2:
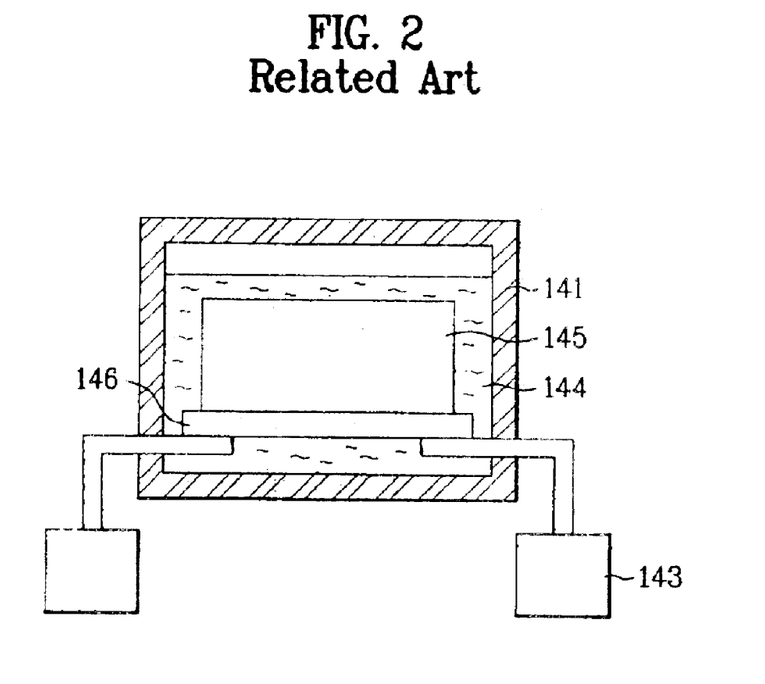
FIG. 2 shows a device for etching a liquid crystal display panel.

The accompanying drawings illustrate a related art method of fabricating LCD devices. FIG. 1 shows a block diagram of related art fabricating processes, FIG. 2 shows a device for etching substrates, and FIG. 3 helps explain problems that can occur in the related art method.

Referring now to FIG. 1, a plurality of crossing gate and data lines are formed on a first substrate, thereby defining a plurality of pixels, and then a plurality of thin film transistors (TFTs) are formed near the crossing points (S1). A passivation layer having a predetermined thickness is then formed over the first substrate, including over the TFTs (S2). The passivation layer is typically an organic insulating material comprised of BCB or acryl resin. That organic insulating material is usually applied as a liquid having a solvent that suspends the organic insulating material. After being applied, the passivation layer is heated to remove the solvent, which leaves as a vapor.

Subsequently, ITO pixel electrodes are formed on the hardened passivation layer and in electrical contact with the TFT (S3). A seal having an injection hole is then formed around the periphery of the first substrate, spacers are dispersed on a second substrate having a color filter layer, and the first and second substrates are attached to each other (S4). Attaching is typically accomplished using pressure and heat or light to harden the seal.

A liquid crystal is then injected between the first and second substrates through the injection hole in the seal, and then the injection hole is sealed to prevent liquid crystal outflow (S5).

After liquid crystal injection, the outer surfaces of the substrates are etched to reduce weight (S6). FIG. 2 shows a suitable etching device. As shown, a container 141 is filled with HF (hydrofluoric acid) 144 from an etchant supply 143. A liquid crystal display panel 145 is then dipped into the HF 144, which etches the surfaces of the liquid crystal display panel 145 formed by the first and second substrates 1 and 11 (see FIG. 3). In practice, a cassette 146 in the container 141 holds the liquid crystal display panel 145.

After etching, the liquid crystal display panel 145 is cleaned to remove the HF and is then drying. This completes a reduced weight liquid crystal display panel 145.

Figure 3:
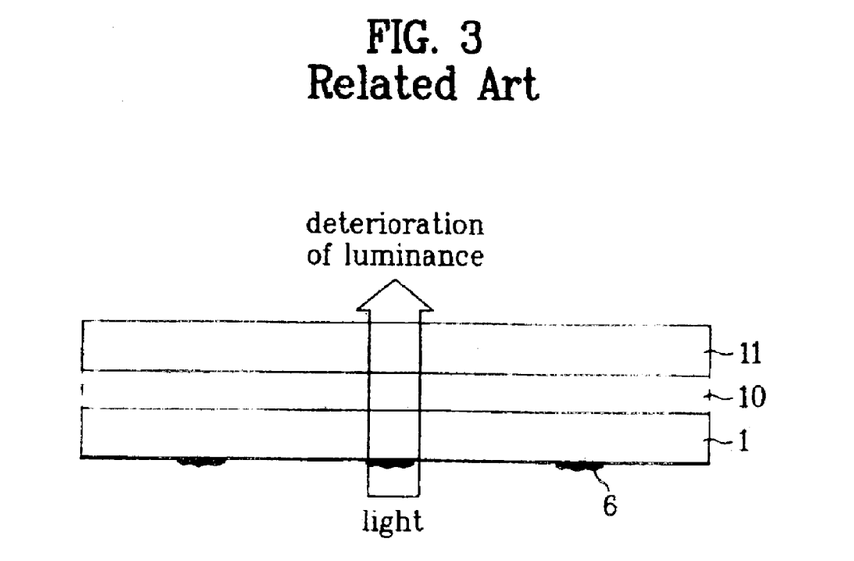
FIG. 3 illustrates fume-induced contaminates that can occur in related art liquid crystal display panels.

While generally successful, the related art liquid crystal display panel 145 has problems. The organic insulating layer is hardened by heating, which drives the solvent off as vapor fumes. Those fumes can cause contaminates 6 on the exposed surfaces of the substrates. Those contaminates are not easily removed, and any residual contaminates 6 cause uneven etching of the glass substrates. Uneven etching is a particular problem on the first substrate because the uneven etching can result in significant picture quality deterioration.

Therefore, a method of removing fume-induced contaminates from the liquid crystal display panel substrates would be beneficial. Even more beneficial would be a method of improving picture quality by planarizing the etched surfaces of the liquid crystal display panel substrates.

SUMMARY OF THE INVENTION

Accordingly, the present invention is directed to a method of fabricating an LCD device that substantially obviates one or more problems due to limitations and disadvantages of the related art.

An object of the present invention is to provide a method of fabricating an LCD device in which a surface of a substrate is evenly etched as a result of removing fume-induced contaminates. Such a method can improve the picture quality of the finished LCD devices.

Additional advantages, objects, and features of the invention will be set forth in the description which follows and will become apparent to those having ordinary skill in the art upon examination of the following or may be learned by practice of the invention. The objectives and other advantages of the invention may be realized and attained by the structure particularly pointed out in the written description and claims hereof, as well as in the appended drawings.

To achieve these objects and other advantages and in accordance with the purposes of the invention, as embodied and broadly described herein, a method of fabricating an LCD device according to the present invention includes forming a thin film transistor on a first substrate; forming an organic insulating layer on the first substrate, including on the thin film transistor; forming a contact hole through the organic insulating layer, simultaneously removing fumes on a surface of the substrate; forming a pixel electrode that is connected to the thin film transistor through the contact hole; attaching the first substrate to an opposing second substrate; and thinning at least one of the first and second substrates by etching.

Preferably, the organic insulating layer is formed by coating an organic insulating material on the substrate, and then by hardening that organic insulating material. Beneficially, the contact hole through the organic insulating layer is formed by plasma etching. Even more beneficially, plasma etching is performed on opposed sides of a substrate by suspending the substrate between plasma electrodes. Suspension can be accomplished by supporting the substrate on pins.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the present invention. In the drawings.

DETAILED DESCRIPTION OF THE ILLUSTRATED EMBODIMENTS

Reference will now be made in detail to illustrated embodiments of the principles of the present invention, examples of which are shown in the accompanying drawings. For clarity, wherever possible the same reference numbers will be used throughout the drawings to refer to the same or like parts.

Figure 5:
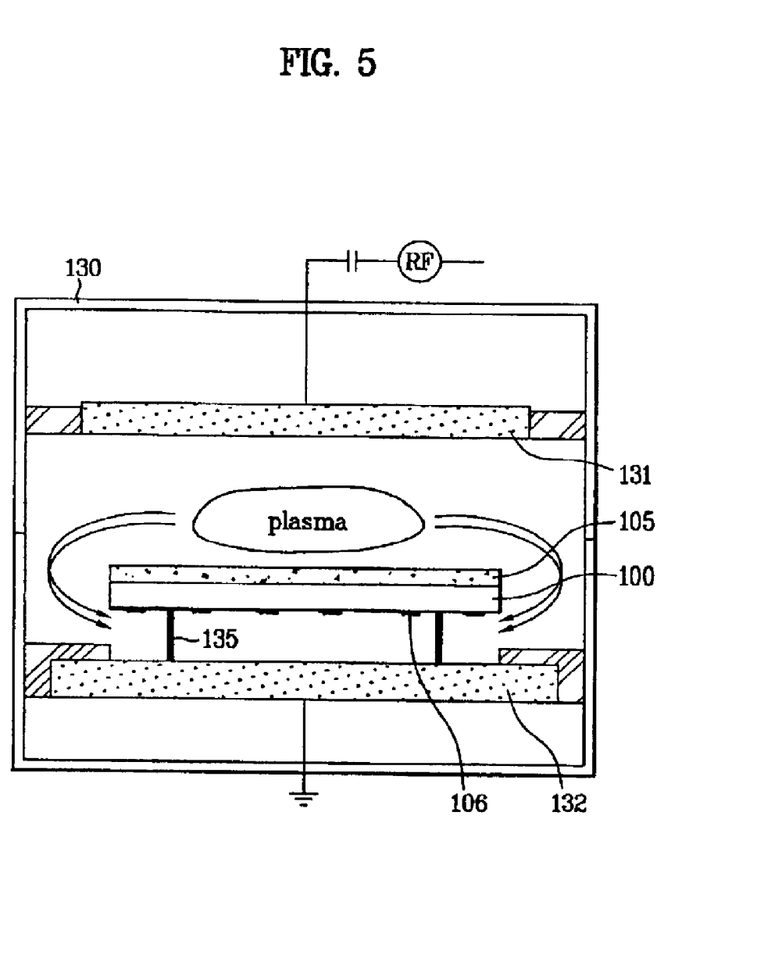
FIG. 5 illustrates a plasma etching device that is in accord with the principles of the present invention.
Figure 6:
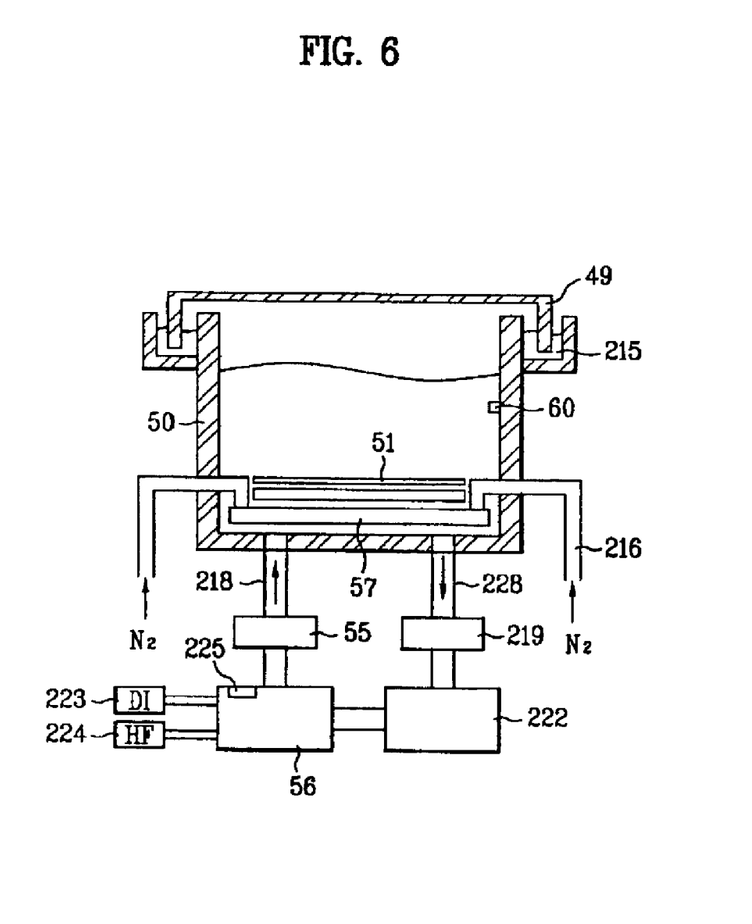
FIG. 6 shows an etching device that is suitable for performing substrate surface etching.

A method of fabricating a liquid crystal display (LCD) device according to the principles of the present invention will be explained with reference to the accompanying drawings. FIG. 4A to FIG. 4F illustrate the results of the fabricating steps used to produce a liquid crystal display panel, FIG. 5 illustrates a plasma etching device, and FIG. 6 illustrates a liquid crystal panel etching device.

Figure 4A:
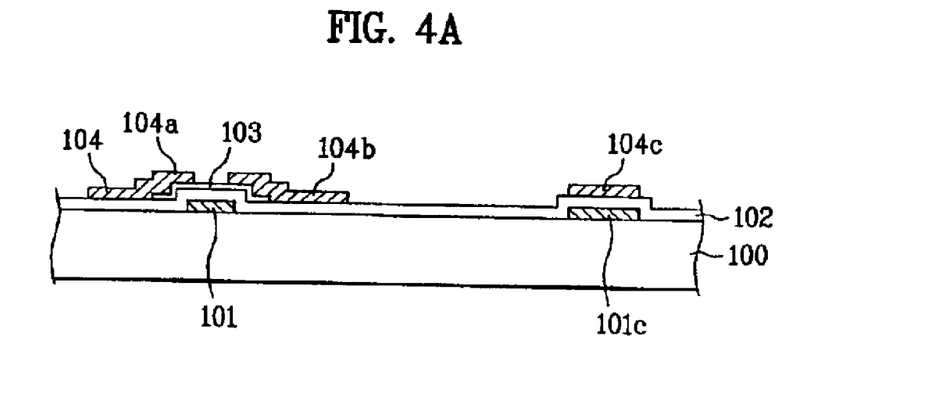
FIG. 4A to FIG. 4F illustrate the fabricating steps of a liquid crystal display panel according to the principles of the present invention.

Referring now to FIG. 4A, Mo and AlNd are sequentially deposited on a first substrate 100. Then, a gate line (not shown) and a gate electrode 101 are formed on the first substrate by photolithography. Simultaneously, a lower electrode 101c of a capacitor is formed in parallel with the gate line. While Mo is beneficial, other materials such as Al, Cr, Ti, W or Al alloy also can be used instead.

Next, an inorganic insulating layer of silicon nitride or silicon oxide is coated over the first substrate, including over the gate line, thereby forming a gate insulating layer 102. Then, an island-shaped semiconductor layer 103 is formed on the gate insulating layer 102 above the gate electrode 101.

After that, a metal such as Cr, Al, Ti, W or Al alloy is deposited over the first substrate, including over the semiconductor layer 103. Then, a data line 104, source/drain electrodes 104a, 104b, and an upper electrode 104c for the capacitor are formed from that metal by photolithography. The data line 104 crosses the gate line, thereby defining a pixel. The source/drain electrodes 104a, 104b are deposited on predetermined regions of the gate insulating layer 102 and on the semiconductor layer 103. This forms a thin film transistor that will be used as a switching device. The lower and upper electrodes 101c and 104c, together with the insulating layer 102, form a storage capacitor.

The storage capacitors maintain a voltage charged into the liquid crystal capacitor during a turn-off period of the TFT. This reduces picture quality deteriorated caused by parasitic capacitances.

The gate and data lines may be formed from a material having low conductivity, such as Cu or Ta.

Figure 4B:
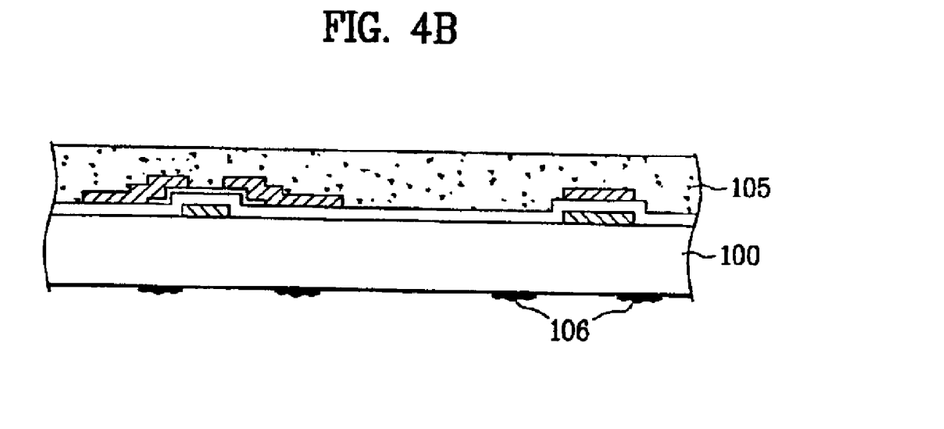

As shown in FIG. 4B, an organic insulating material is coated at a predetermined thickness over the first substrate, including over the data line 104. This forms an organic passivation layer 105. In general, the passivation layer 105 is formed of an organic insulating material having a low dielectric constant, such as BCB or acryl resin, and a solvent. The passivation layer 105 reduces the parasitic capacitance, thereby improving the aperture ratio.

However, the organic insulating layer should be hardened in an oven to drive off the solvent. Still referring to FIG. 4B, during hardening the solvent within the organic insulating material is evaporated as fumes that form contaminates 106 on the exposed surface of the first substrate 100.

Figure 4C:
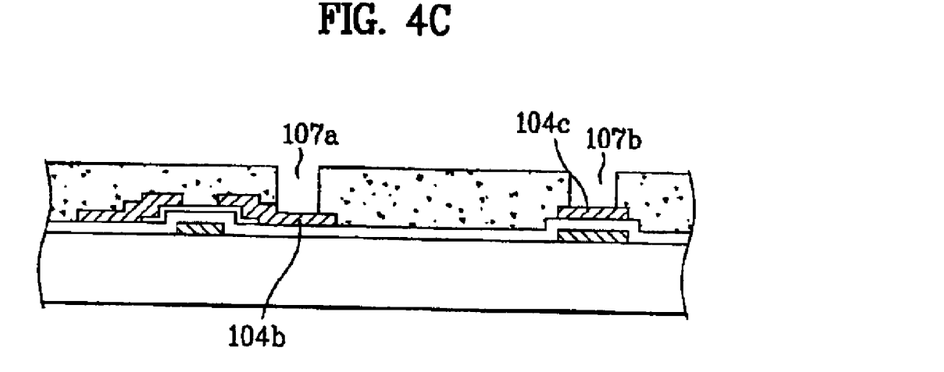

Referring now to FIG. 4C, after hardening, the passivation layer 105 is selectively plasma etched to expose a portion of the drain electrode 104b and a portion of the lower electrode 104c through first and second contact holes 107a, 107b. Simultaneously, the contaminates 106 on the surface of the first substrate are also removed by the plasma etching. Thus, an additional process step that could be used to remove the contaminates 106 is not required. Furthermore, because the exposed surface of the first substrate 100 is clean, that surface can be evenly etched by a subsequent etch process.

Suitable plasma etching will be explained with reference to FIG. 5. First, a mask (not shown) having patterns for the contact holes are formed on the first substrate 100, including on the passivation layer 105. Then, the first substrate 100 is loaded onto an upper surface of a lower electrode 132 in a plasma etching device 130 such that the first substrate 100 is spaced from the upper surface of a lower electrode 132 by lift pins 135.

After that, plasma is generated by a voltage applied between the lower electrode 132 and an upper electrode 132. That plasma etches both the passivation layer 105 and the exposed surface of the first substrate 100. Thus, the contaminates 106 on the lower surface are removed.

Figure 4D:
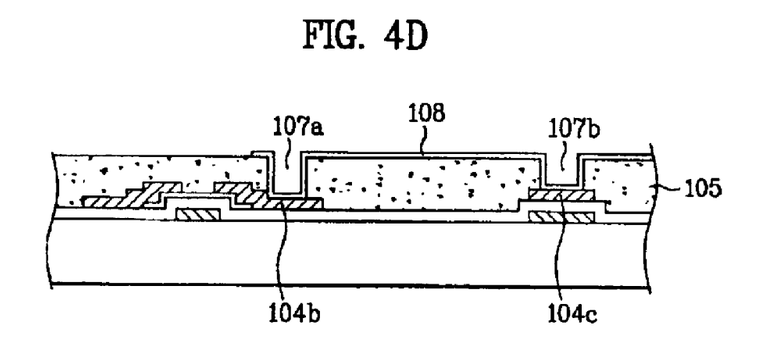

Referring now to FIG. 4D, a pixel electrode 108 of indium tin oxide (ITO) is then formed on the passivation layer 105 and in the first and second contact holes 107a and 107b so as to contact both the drain electrode 104b and the lower electrode 104c. While not shown, a sealant having an injection hole is formed around the margin of the first substrate 100 while spacers are uniformly scattered on a second substrate 111.

Figure 4E:
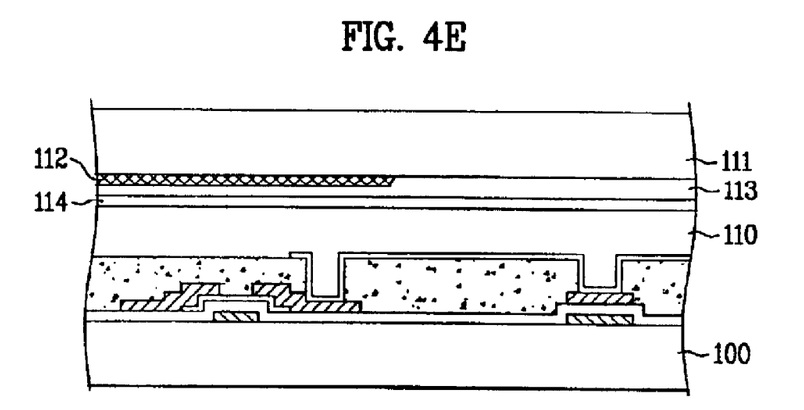

As shown in FIG. 4E, the second substrate 111 includes a black matrix layer 112, a color filter layer 113, and a common electrode. 114. The first and second substrates 100 and 111 are then attached to each other using the sealant. The sealant is then hardened by heat or radiant energy (UV light) as the first and second substrates 110 and 111 are pressed together.

Figure 4F:
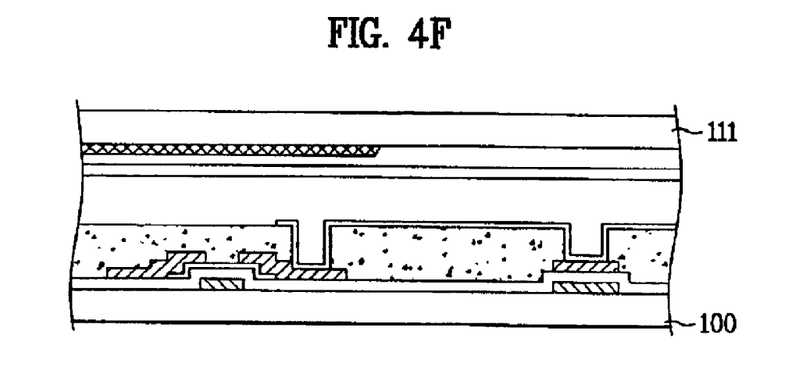

FIG. 4F shows the first and second substrates 100 and 111 after being thinned to a predetermined thickness by etching. This reduces the thickness and weight of the resulting liquid crystal display panel. To prevent the etchant from penetrating into the liquid crystal display panel it is beneficial to form a dual patterned sealant. Additionally, if the liquid crystal is not disposed between the first and second substrates prior to substrate thinning, the injection hole is beneficially sealed. Thus, either before or after thinning a liquid crystal is disposed between the first and second substrates. Alternatively, the liquid crystal layer 110 can be disposed between the first and second substrates by liquid crystal dispensing.

After attachment, the substrates 100 and 111 are etched to decrease the thickness of the LCD device. The substrates can be etched in various ways. Typically, the liquid crystal display panel is dipped in a container having HF. That is, the attached first and second substrates are dip etched. Since the contaminates 106 have been removed, the substrates are evenly etched, thereby preventing uneven substrate surfaces.

FIG. 6 shows a useful substrate etching device. That device includes a container 50, a lid 49, a bubble plate 57, a gas supply pipe 216, an etchant supply pipe 218, an etchant discharge pipe 228, and a temperature sensor 60.

The lid 49 encloses the container 50 via a water sealant 215. The bubble plate 57 is within the container 50 and is used for generating bubbles. The gas supply pipe 216 provides $N_2$ or $O_2$ from a gas supply (not shown) to both sides of the bubble plate 57. The etchant supply pipe 218 passes through the bottom of the container 50 to provide etchant from an etchant mixing part 56 to the container 50. An etchant discharge pipe 228 also passes through the container and is used to discharge the etchant. The temperature sensor 60 measures changes in temperature within the container 50.

The discharged etchant is first filtered to remove residue and is then stored in a buffer tank 222. The filtered etchant is subsequently returned to the etchant mixing part 56 where it is mixed with deionized water DI and HF provided from DI and HF providers 223 and 224.

The etchant mixing part 56 also includes a concentration detecting device 225 that detects the concentration of the mixed etchant. If the concentration of the etchant is correct, the supply of DI and HF is stopped. The reference concentration of the mixed etchant is between 1 and 50%. The etchant mixing part 56 further includes a coolant pipe for maintaining the mixed etchant at a predetermined temperature.

The etching process will be explained with reference to FIG. 6. First, a glass substrate 51 is loaded into a cassette (not shown) within the container 50. Then, a pump 55 that supplies mixed etchant to the container 50 is turned on. Mixed etchant then flows into the container 50.

After the container 50 is filled to a predetermined level, the etching process itself is started. The etchant reacts with the silicon oxide (SiOx) that comprises the glass substrates to produce heat that is detected by the temperature sensor 60. When the temperature reaches a predetermined level the etching process is automatically stopped. The predetermined temperature itself depends on the thickness and on the number of substrates. The predetermined temperature is called the reaction temperature.

The reaction temperature is determined by:

$$Tt = Ti + (Kr \cdot N \cdot \Delta t2)/m$$

(where Tt is the reaction temperature, Ti is the initial temperature, Kr is a reaction constant, N is the number of substrates, and $\Delta t2$ is the thickness to be etched). An example may be helpful. In practice, a 1.4 mm thick substrate can be etched to 0.5 mm.

The bubble plate 57 generates bubbles that improve the evenness of the etch.

After etching, the thinned liquid crystal display panel is cleaned to remove residual HF. Then, the HF cleaned liquid crystal display panel is dried, thereby completing the fabrication of a thin, lightweight liquid crystal display panel.

In the illustrated embodiment of the present invention, the passivation layer was organic. However, the principles of the present invention are suitable for use with other types of materials. Additionally, the principles of the present invention are suitable for use with color filter array substrates.

Fabricating LCD devices according to the present invention has advantages. First, contaminates on the surface of the substrate are removed during a plasma etch process. This enables even substrate etching. Accordingly, uneven surfaces are prevented, which improves picture quality. Thus, an additional process step is not required to remove the fume-induced contaminates.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a display device, comprising:
   forming an organic insulating layer on a first surface of a substrate, wherein the organic insulating layer includes a solvent;
   heating the organic insulating layer to drive off the solvent as fumes;
   removing fume-induced contaminates on a second surface of the substrate during a formation of a contact hole in the organic insulating layer, the second surface being opposite to the first surface; and
   etching the second surface of the substrate to reduce the thickness of the display device.

2. The method of claim 1, wherein forming the organic insulating layer includes coating an organic insulating material on the substrate; and wherein heating the organic insulating layer hardens the organic insulating material.

3. The method of claim 1, wherein the organic insulating layer includes a material selected from a group consisting of beazocyclo butene (BCB) and acryl resin.

4. The method of claim 1, wherein the contact hole is formed by a plasma etching.

5. The method of claim 1, wherein the etching the second surface of the substrate uses hydrofluoric acid (HF).

6. A method for fabricating a liquid crystal display device, comprising:
   forming a thin film transistor on a first surface of a first substrate;
   forming an organic insulating layer over the thin film transistor, by locating an organic insulting material having a solvent on the first substrate and by driving off the solvent from the organic insulating material as fumes;
   etching the organic insulating layer and the first substrate to form a contact hole through the organic insulating layer and to remove fume-induced contaminates from a second surface of the first substrate, the second surface being opposite to the first surface;
   forming a pixel electrode connected to the thin film transistor through the contact hole;
   attaching the first substrate to an opposed second substrate to form a panel; and
   etching the panel to thin the first substrate.

7. The method of claim 6, wherein forming the organic insulating layer includes heating the organic insulating material.

8. The method of claim 6, wherein the organic insulating material includes a material selected from a group consisting of BCB and acryl resin.

9. The method of claim 6, wherein etching the organic insulating layer and the first substrate is performed using plasma etching.

10. The method of claim 6, wherein the panel is etched with HF.

11. The method of claim 6, further including disposing a liquid crystal layer between the first and second substrates.

12. A method of etching a substrate, comprising:

disposing a substrate having a front side surface and a back side surface between two plasma-inducing electrodes in a plasma-etching chamber such that both the front and back side surfaces of the substrate are exposed to a plasma, wherein the front side surface of the substrate has a photo-resist pattern as a mask and the back side surface of the substrate has contaminates; and plasma etching both the front and back side surfaces of the substrate such that the back side surface of the substrate is cleaned of the contaminates.

13. A method according to claim 12, wherein disposing the substrate includes placing the substrate on pins to position the substrate between the two plasma inducing electrodes.

14. A method for fabricating a liquid crystal display device, comprising:

forming a thin film transistor on a first substrate;

forming an insulating layer over the first substrate, including over the thin film transistor, by locating an insulting material having a solvent on the first substrate and by driving the solvent off as fumes;

etching the insulating layer and the first substrate to form a contact hole through the insulating layer and to remove fume-induced contaminates from a surface of the first substrate;

forming a pixel electrode connected to the thin film transistor through the contact hole;

attaching the first substrate to an opposed second substrate to form a panel; and etching the panel to thin the first substrate; wherein the step of etching the insulating layer and the first substrate includes;

disposing the first substrate between two plasma electrodes in a plasma chamber such that the insulating layer and a side of the first substrate opposite the insulating layer are exposed;

masking the insulating layer; and plasma etching the insulating layer and the side of the first substrate opposite the insulating layer.

15. A method of fabricating a liquid crystal display device according to claim 14, wherein forming the insulating layer includes heating the insulting material to drive of the solvent.

16. A method of fabricating a liquid crystal display device according to claim 14, wherein etching the panel includes dipping the panel into HF.

17. A method of fabricating a liquid crystal display device according to claim 14, wherein forming the insulating layer includes locating an organic insulting material on the first substrate.

18. The method of claim 17, wherein the organic insulating material includes a material selected from a group consisting of BCB and acryl resin.

* * * * *